(12) United States Patent
Gordon et al.

(10) Patent No.: US 11,727,038 B1
(45) Date of Patent: Aug. 15, 2023

(54) TABULAR DATABASE REGROUPING

(71) Applicant: VAST DATA LTD., Tel Aviv (IL)

(72) Inventors: Eyal Gordon, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/649,537

(22) Filed: Jan. 31, 2022

(51) Int. Cl.
    *G06F 16/00* (2019.01)
    *G06F 16/28* (2019.01)
    *G06F 16/22* (2019.01)

(52) U.S. Cl.
    CPC .......... *G06F 16/285* (2019.01); *G06F 16/221* (2019.01)

(58) Field of Classification Search
    CPC ..................................................... G06F 16/285
    USPC ......................................................... 707/738
    See application file for complete search history.

(56) References Cited

U.S. PATENT DOCUMENTS

| | | | | |
|---|---|---|---|---|
| 2012/0030729 | A1* | 2/2012 | Schwartz | H04L 63/105 726/1 |
| 2014/0059311 | A1* | 2/2014 | Oberhofer | G06F 3/065 711/162 |
| 2014/0280193 | A1* | 9/2014 | Cronin | G06F 16/24558 707/741 |
| 2015/0046354 | A1* | 2/2015 | Wilkins | G06Q 50/01 705/319 |

\* cited by examiner

*Primary Examiner* — Alexandria Y Bromell
(74) *Attorney, Agent, or Firm* — Reches Patents

(57) ABSTRACT

There may be provided a method for managing column extents of a tabular database, the method may include (a) generating a multi-snapshot row score to each row of a group of rows of the tabular database multiple rows; wherein the multi-snapshot score is indicative of fullness of the row in the multiple snapshots; wherein the group of rows comprises column extents associated with column extents metadata; and (b) improving a column extent metadata parameter by reordering the rows of the group of rows according to the multi-snapshot row scores to provide a re-ordered group of rows that comprises re-ordered group extents associated with re-ordered column extents associated with re-ordered column extents metadata.

17 Claims, 8 Drawing Sheets

| Score | Row |
|---|---|
| 2.1.3 | 310(1) |
| 2.1.3 | 310(2) |
| --- | 310(3) |
| --- | 310(4) |
| 2.1.3 | 310(5) |
| 3.1.3 | 310(6) |
| 1.1.3 | 310(7) |
| 3.3.3 | 310(8) |
| 0.2.3 | 310(9) |
| 0.1.3 | 310(10) |
| 0.1.3 | 310(11) |
| --- | 310(12) |
| --- | 310(13) |
| 3.1.3 | 310(14) |
| 3.1.3 | 310(15) |
| 0.2.3 | 310(16) |
| --- | 310(17) |
| 0.0.3 | 310(18) |
| 1.0.3 | 310(19) |
| 3.0.3 | 310(20) |

Table 4.1

| Score | Row |
|---|---|
| 3.3.3 | 310(8) |
| 3.1.3 | 310(6) |
| 3.1.3 | 310(14) |
| 3.1.3 | 310(15) |
| 3.0.3 | 310(20) |
| 2.1.3 | 310(1) |
| 2.1.3 | 310(2) |
| 2.1.3 | 310(5) |
| 1.1.3 | 310(7) |
| 1.0.3 | 310(19) |
| 0.2.3 | 310(9) |
| 0.2.3 | 310(16) |
| 0.1.3 | 310(10) |
| 0.1.3 | 310(11) |
| 0.0.3 | 310(18) |

Table 4.2

FIG. 4

TABULAR DATABASE REGROUPING

TECHNICAL FIELD

The present disclosure generally relates to the field of data storage, and more particularly to managing a tabular database.

BACKGROUND

A tabular database, is a database that is composed of tables that arrange data elements in vertical columns and horizontal rows. Each cell is formed by the intersection of a column and row.

A database snapshot is a view of a database as it was at a certain point in time. Multiple snapshots can exist for a given database or table. A database snapshot should be preserved for at least a certain period or until it is explicitly deleted by the database user. A snapshot is not a full copy of the database. It points to the original version of pages that were not changed in the snapshot, and stores changes in the source since the snapshot was created.

SUMMARY

There may be provided a storage system, a method and a non-transitory computer readable medium for tabular database regrouping.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 4 is an example of re-ordering a table rows.

DETAILED DESCRIPTION

Figure 1:
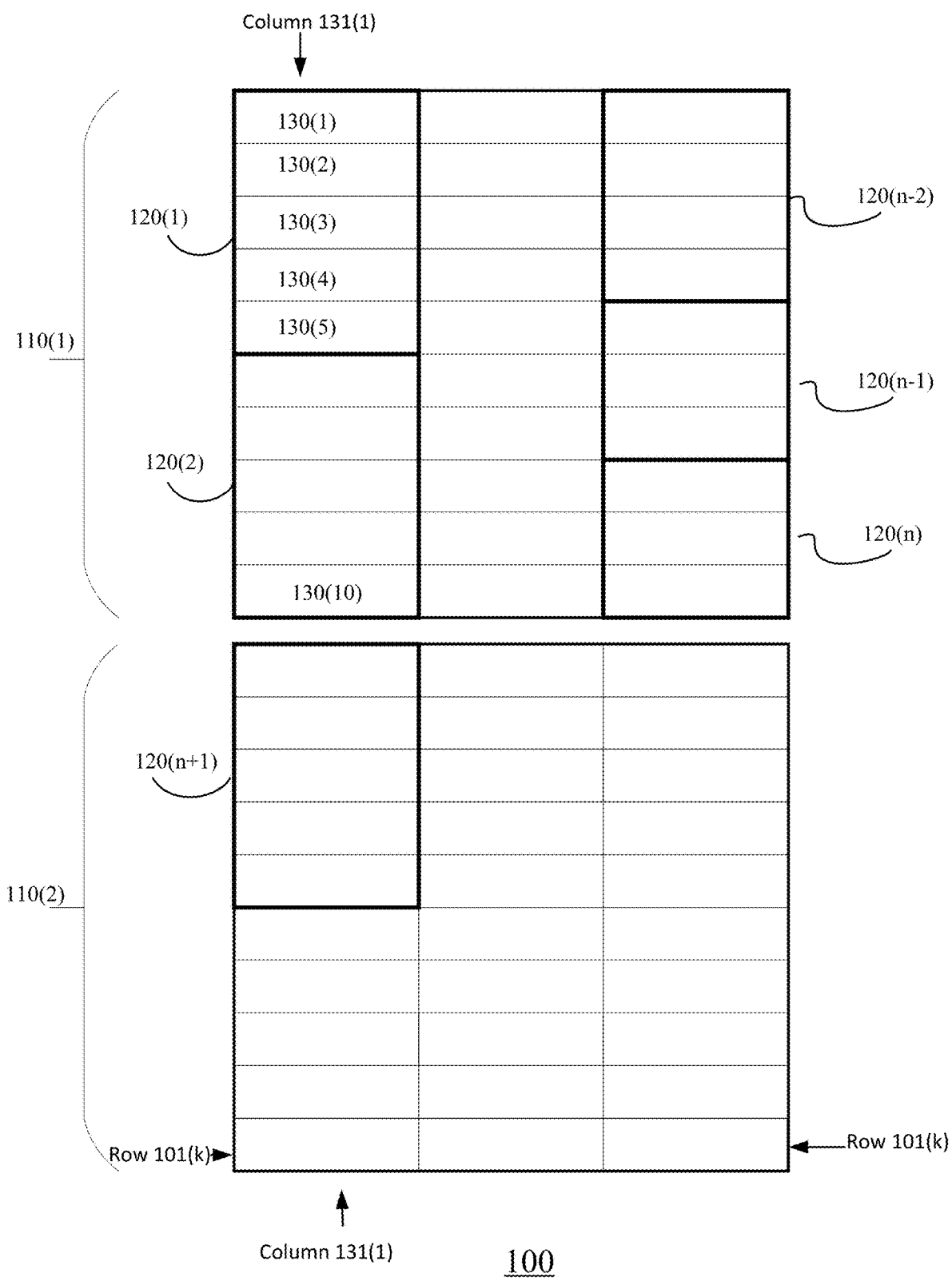
FIG. 1 is an example of a database table structure.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a controller. The controller can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

FIG. 1 illustrates a table 100 of a tabular database, implemented as rows and columns, such as row 101(*k*) and column 131(1). Rows are split into row groups, such as row group 110(1) and 110(2), where each includes, in this example, ten rows each, though the number of rows in a row group may exceed thousands and dozens of thousands. A cell (or a field) is the intersection between a row and a column and stores a value related to the specific row and column.

The data stored in the table is grouped into column extents, such as column extents 120(1), 120(2), 120(*n*−2), 120(*n*−1), 120(*n*), and 120(*n*+1). The enumerator n indicates the number of column extents in row group 110(1). Other row groups may include a different number of extents, having different sizes. Other versions of row group 110(1) may include a different number of extents as will be further described. A column extent is a portion of a column, within the boundaries of a certain row group, and includes a sequence of consecutive cells (that stores values) along the column portion. For example, column extent 120(1) includes cells 130(1)-130(5).

Each row is assigned with a unique row identifier (ID) that is allocated to the row upon a creation of the row or upon relocation of the row. Each row group may include thousands or more rows (e.g., 64K rows) having consecutive row IDs, therefore the row group IDs can be determined by the number of rows and the number of rows in a row group. For example, the row group ID of a certain row ID can be determined by: <Row-ID>/64000, where 64000—is the number of rows in a row group.

Each column extent is assigned with a column extent ID (CEID), that is composed of:
(i) the row group ID—determined by the start row of the column extent divided by the number of rows per row group, the row group ID may compose the most significant part of the CEID;
(ii) column ID; and (iii) row offset within the row group, which is obtained by: <the extent's start row ID> modulo <number of rows in a row group>.

For example, the ID of column extent $120(n+1)$ is composed of: row group=2; column ID=1; and row offset=1 (<extent's start row ID=11> modulo <number of rows in a row group=10>.

According to the CEID scheme, the column extents may be indexed and sorted according to an order that is determined firstly by the row group, then—their column, and their order within the column. For example, the lowest column extent index will be assigned to column extent $120(1)$, that is followed be the index of column extent $120(2)$, followed by column extents of the middle column, with the boundaries of row group $110(1)$, followed by column extents $120(n-2)$, $120(n-1)$ and $120(n)$, and then followed by column extents from the next row group, such as column extent $120(n+1)$.

The metadata of each column extent includes: (i) CEID—that indicates the row group, the column, and the row start offset within the column; (ii) number of rows of the extent (or in other words—the number of values stored by the column extent); (iii) a version (or a timeline indication); (iv) pointer to the set of values corresponding to each row within the column extent; and (v) optionally, filtering metadata (e.g., minimum and maximum values within the set of values, bloom filter, etc.). The content of each column extent is stored in sequential addresses of the permanent storage.

The metadata of column extents of one table will be stored in a table metadata structure having nodes for various ranges of the column extents. The table metadata structure is indexed and sorted according to CEIDs. The size of the table metadata structure depends on the number of column extents, therefore, there is a need to keep the number of extents as small as possible.

Figure 2:
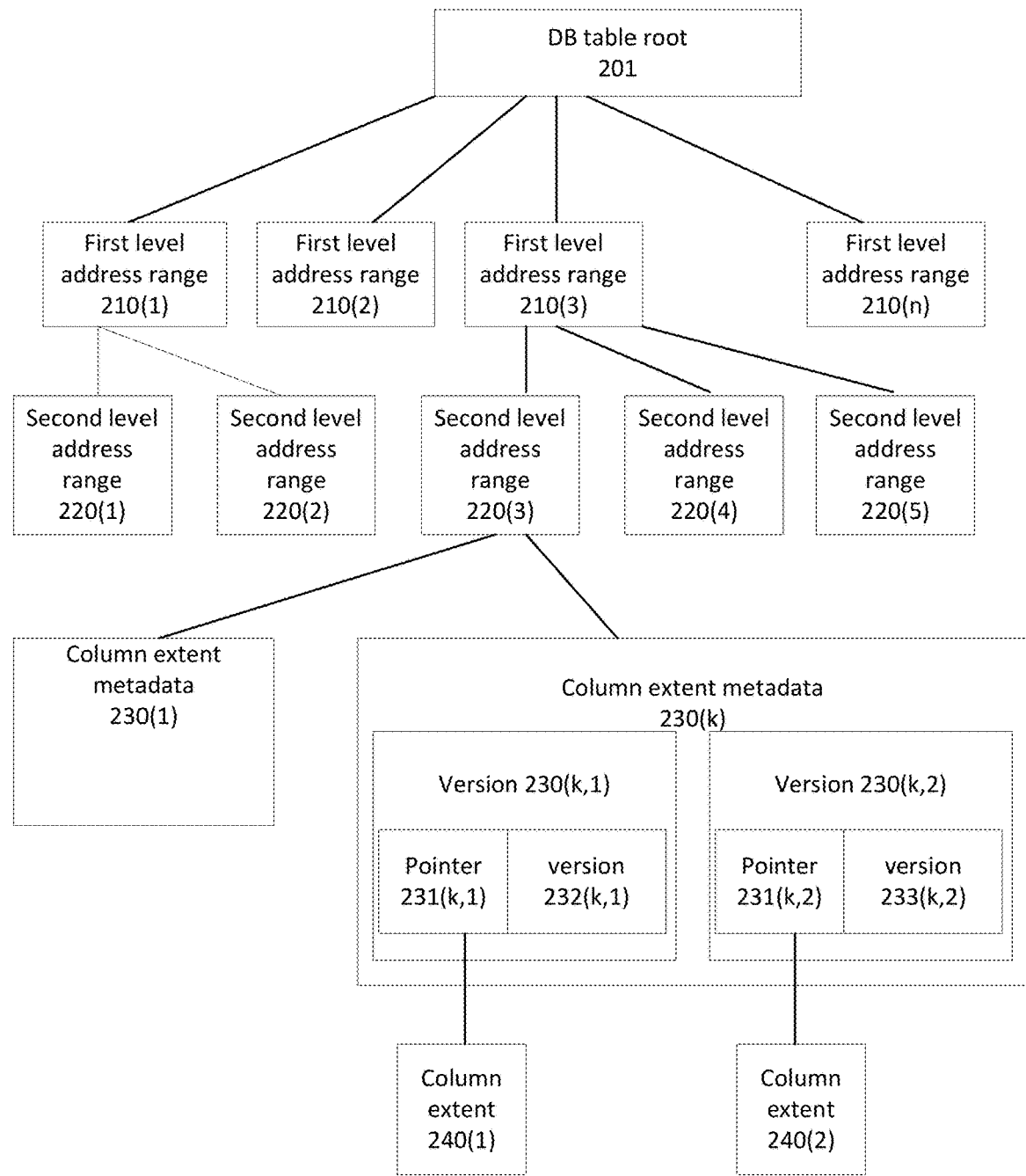
FIG. 2 is an example of database table metadata structure.

FIG. 2 illustrates a table metadata structure for mapping CEIDs of column extents, into physical locations where the column extents are stored.

In FIG. 2, the table metadata structure is illustrated as a B-tree 200 that includes DB table root 201 that points to first level nodes $210(1)$-$210(n)$ mapping a first level address ranges into lower layers. Each first level node may point to one or more second level nodes that maps second level address ranges. The address ranges relate to CEID ranges, for example, CEIDs of column extents $120(1)$-$120(n-1)$ may be mapped by one node of first level address range into more than one node of second level address range, e.g., 2 nodes of the second level, such as $220(1)$ and $220(2)$, each further maps half of the CEIDs included in the range $120(1)$-$120(n-1)$.

There may be more than first and second levels of address ranges splitting the ranges into smaller address ranges in each subsequent level. The second level nodes may be mapped into the column extent metadata nodes, for example, node $220(3)$ is mapped to column extent metadata $230(1)$ till $230(k)$.

Each column extent metadata may include information of one or more versions of the column extent. For example, column extent metadata $230(k)$ may include a first version metadata $230(k,1)$ and a second version metadata $230(k,2)$ about a first and a second version of the column extent.

Each version metadata of a column extent may include one or more pointers to the location (in the storage system) of the stored column extent and the version of the column extent. For example—pointer $231(k,1)$ of the first version having a version $232(k,1)$ and pointer $231(k,2)$ of the second version having a version $232(k,2)$. Column extents $240(1)$ and $240(2)$ are the content of different versions related to CEID ranges mapped by second level address range $220(3)$.

Figure 3:
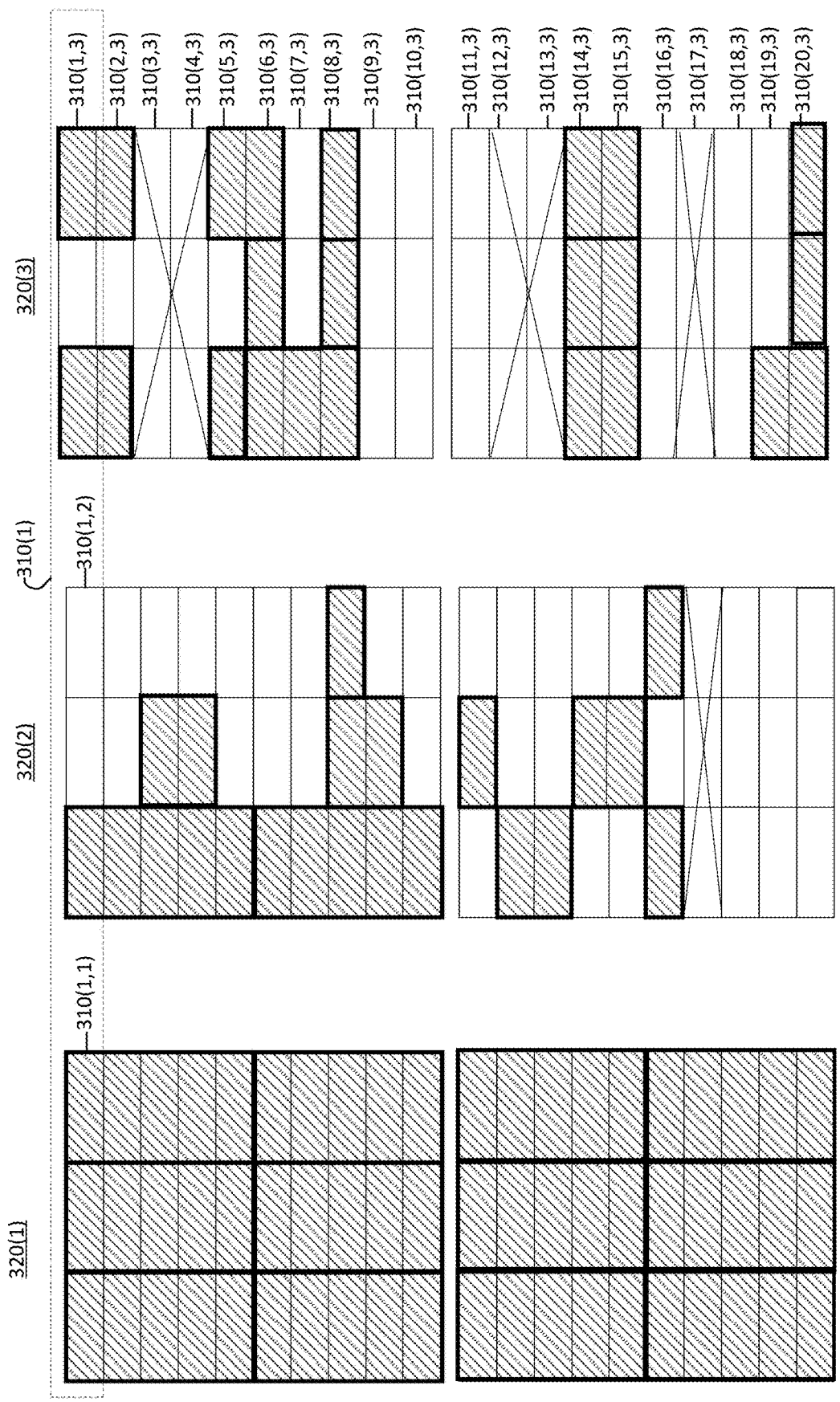
FIG. 3 is an example of a database table content of different snapshots.

FIG. 3 illustrates a database table 300 having three versions, and the updates that were performed at different time periods. At a first time period, e.g., between t0 and t1, multiple rows were written to the database table, forming a first version $320(1)$ that includes multiple column extents filled with values. It is assumed that at time t1, a snapshot was taken and therefore the values that were written until t1 need to be preserved. The column extents are illustrated with thick line borders. The diagonal lines within the cells illustrate cells that stores values (rather than empty cells). Though all the column extents are illustrated as having the same size, the column extents may vary in size, particularly (but not only) among different columns.

A second version $320(2)$ stores only cells whose values were changed during a period t1-t2 that corresponds to version $320(2)$. A newest version $320(3)$ stores only cells whose values were changed during a period t2-t3 that corresponds to version $320(3)$.

As can be understood, column extents of newer versions can be smaller than the original column extents. In this example, the original extents are illustrated as storing five values from five rows of the same column, while versions $320(2)$ and $320(3)$ includes shorter column extents of one or two values.

Each row exists in all the versions. For example, row $310(1)$ has a first version $310(1,1)$ that belongs to snapshot $320(1)$, a second version $310(1,2)$ that belongs to snapshot $320(2)$, and a third version $320(1,3)$ that belongs to snapshot $320(3)$.

The third and forth rows were deleted in the newest version $320(3)$, as illustrated by the cross mark over rows $310(3,3)$ and $310(4,3)$, as well as other rows of the newest version, $310(12,3)$ and $310(13,3)$. The seventeenth row was deleted in version $320(2)$ and does not exists in this version or in the following version $320(3)$.

Due to row deletions and due to overwriting cells during various periods related to different versions, column extents may become smaller than the original planned size of column extents. For example, the left upper extent of versions $320(1)$ and $320(2)$ included values from 5 rows. On version $320(3)$, due to deletion of rows $310(3,3)$ and $310(3,4)$, a hole was formed in the left upper extent, causing this extent to be split into two extents, one of two values and one of one value.

The overwriting of cells during time periods related to different versions, also causes smaller column extents. For example, the second column extent in the left column of version $320(2)$ is full and stores values of five rows. Three of these values were rewritten in version $320(3)$, forming an extent of only three values.

Therefore, over time, holes are formed in the sequence of values of the column extents. When holes are formed in a sequence of values of a column extent, the column extent is split, and two entries of column extent metadata are now required to describe the two halves of the split column extent, causing doubling the size of the metadata required to describe the same amount or even less data. Therefore, there is a need to regroup rows into new row groups, so as to increase the average length of values sequences stored by column extents, and to result a smaller number of column extents.

A background process is executed for regrouping row groups, that will create sufficiently large column extents of live rows.

A sequence of new consecutive row IDs are allocated for the rows to be relocated, and the order of relocating the live rows into the new locations is determined.

The process may start with a first phase of relocating live (non-deleted) rows that belong to the newest version. This process includes relocating the newest version as well as all the previous versions of the rows that are alive in the newest version.

The first phase may be followed by a second phase of relocating live rows that belong to the next version in the timeline, that were deleted in the newest version (and were not relocated in the first phase), including relocating all the previous versions of the relocated rows. The process may proceed backwards in versions, until completing relocation of all rows, that were alive in any existing version.

The order of the relocated rows is determined based on row's cell information of each row. According to one embodiment, the order of the rows to be relocated is determined according to the number of full cells (cells storing values) in the row, particularly in newer versions. When full or mostly full rows are grouped together, there is a good chance for increasing the size of sequences of full cells in the columns, and therefore minimizing the number of column extents.

Each row may be assigned with a score that indicates the number of full fields in the row. For example, rows 310(6,3), 310(8,3), 310(14,3), 310(15,3) and 310(20,3) of version 320(3) are assigned with the higher score, since these rows are completely full. The score for these rows may have for example, the value 3, to indicate that these rows have 3 full fields.

According to another embodiment, the order is determined according to locations of full cells within the rows. For example, each row may be associated with a bitmap that indicates which cells are full. Referring to FIG. 3, row 310(1,3) has a bitmap value of 5 ('101'— indicates two full cells on the left and right, and an empty cell in the middle). Row 310(8,3) has a bitmap value of 7 ('111'). The row's cell information in this example may be the bitmap. When ordering the rows according to the bit map, rows having an identical or similar bitmap will be adjacent. The bitmap may be further used for detecting pairs of rows having at least a certain number of full cells sharing the same offsets.

The row's cell information may also be a combination of the number and locations of the full cells. For the sake of simplicity, in the following examples, it is assumed that the number of full cells is used as the score.

The scores of the rows in older versions that correspond to the live rows of the newest version may be also taken into account, although with a lower weight. For example, with regard to the eighth row 310(8,3), when taking into account all the versions of the row, this row may have a higher score than row 310(6,3), since the older version 320(2) of the eighth row has three fields with values, while the older version of the sixth row has only one field with value. The score of the entire eight row, i.e., all the versions of the row, may be 3.3.3, where the score of the sixth row may be 3.1.3. The left number is the most significant part of the score and indicates the part of the newest version. The middle number indicates the contribution of the corresponding version 320(2). The rightmost number indicates the contribution of the oldest version.

FIG. 4 shows a table 4.1 with the scores given to different rows based on the number of full cells in each version of the rows. Table 4.2 illustrates the scores after being ordered from the highest to lowest, and the corresponding rows. The order illustrated in table 4.2 may be the order used for relocating live rows at the first phase of relocating rows that are alive in the newest version. It is noted that at this phase, rows that are deleted from the newest version do not participate at this phase, therefore, the deleted rows are omitted from table 4.2.

Figure 5:
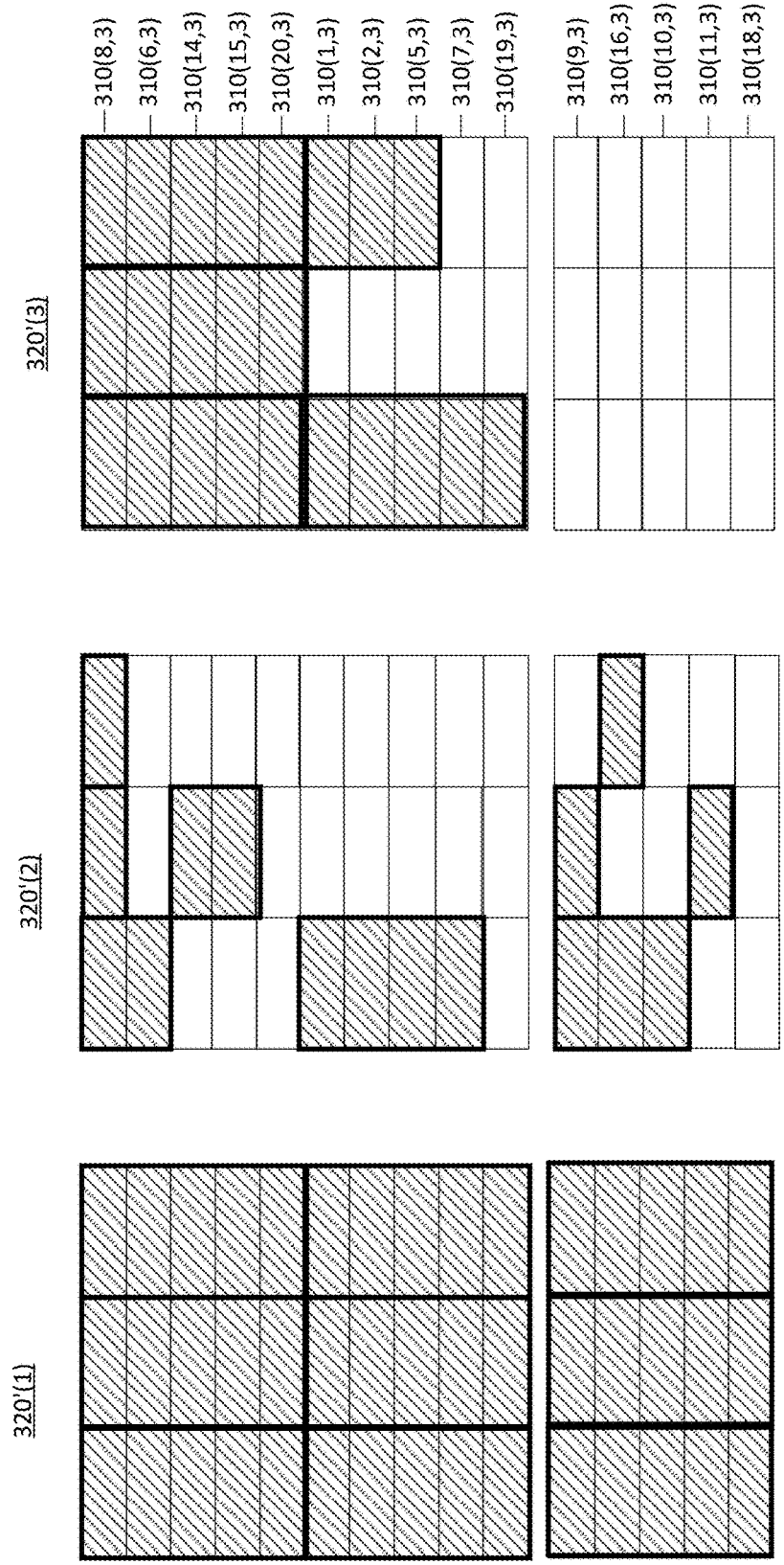
FIGS. 5-6 are examples of re-ordered database table

FIG. 5 illustrates the three versions 320'(1)-320'(3) of the ordered rows and the new column extents (illustrated with thick borders) after the relocation of the live rows of the newest version along with the corresponding rows from older versions.

The process may then proceed with the next phase of relocating live rows from the next version in timeline after the newest version. The live rows of the next version are rows that were deleted in the newest version and therefore were not relocated during the first phase, such as rows 310(3,3), 310(4,3), 310(12,3) and 310(13,3).

Figure 6:
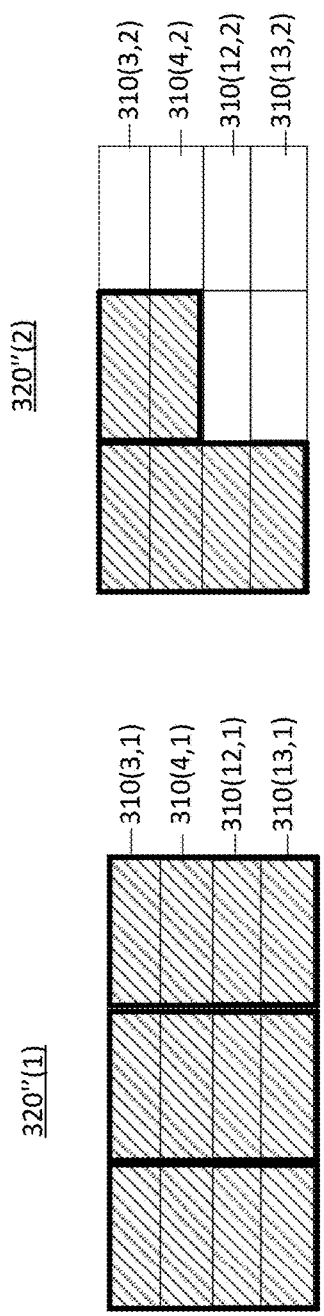

FIG. 6 illustrates the two versions 320"(1) and 320"(2) of the ordered rows and the new column extents (illustrated with thick borders) after the relocation of the live rows of the next version along with the corresponding rows from older versions (in this case version 320(1)).

The process may proceed with a third phase of relocating live rows from the third version (oldest version in this example). The live rows of the third version are rows that were deleted in the proceeding (newer) version 310(2) and therefore were not relocated during the previous phase. In this example, the only live row to be handle is the 17th row of the original set.

Figure 7:
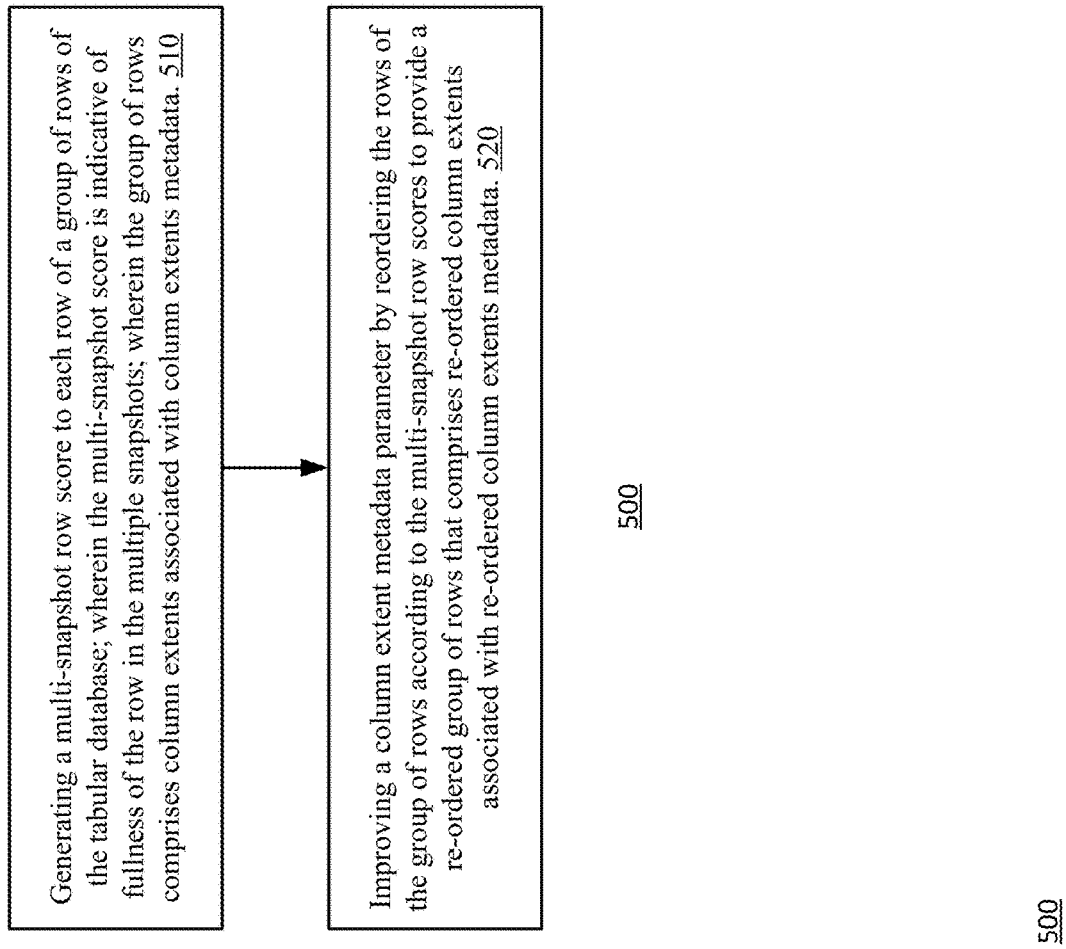
FIG. 7 is an example of a method.
Figure 8:
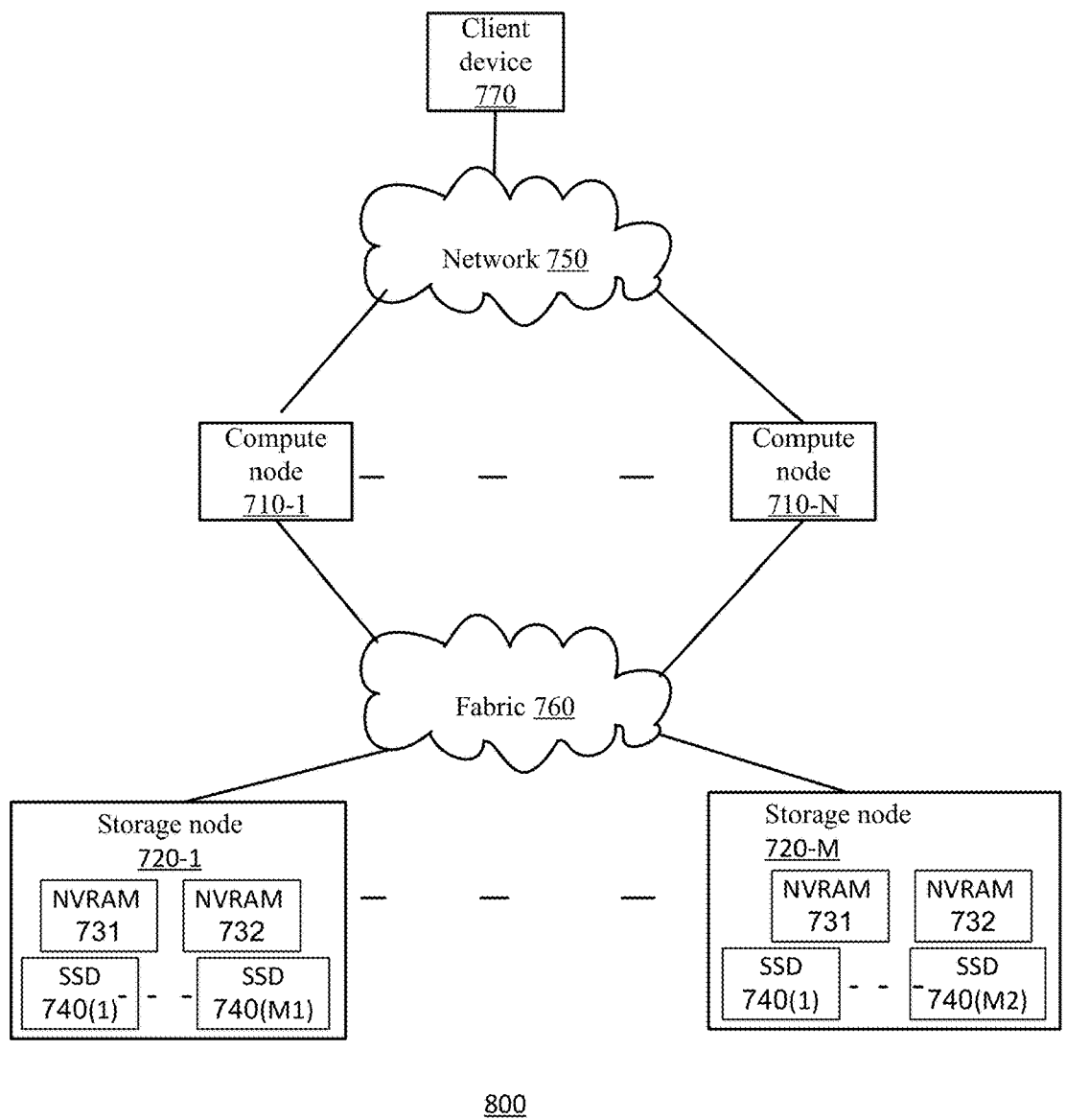
FIG. 8 is an example of a storage system.

FIG. 7 illustrates method 500 for managing column extents of a tabular database.

Method 500 may start by step 510 of generating a multi-snapshot row score to each row of a group of rows of the tabular database.

The group of rows may include some rows of the tabular database or all of the tabular database. There may be any number of rows in the group of rows.

The multi-snapshot score is indicative of fullness of the row in the multiple snapshots. See, for example the scores of table 4.1 and 4.2. While tables 4.1 and 4.2 illustrate a score related to three snapshots, the score may be related to two, or four or more snapshots.

The group of rows may include column extents. The column extents may be associated with column extents metadata. For example—column extent metadata 230(1)-230(k) of FIG. 2.

Step 510 may be followed by step 520 of improving a column extent metadata parameter by reordering the rows of the group of rows according to the multi-snapshot row scores to provide a re-ordered group of rows that may include re-ordered column extents associated with re-ordered column extents metadata. The reordering the rows of the group results a reduced number of column extents within the re-ordered column extents. See for example FIGS. 3 and 5, that illustrates fourteen column extents in version 320(3) and only five column extents in the re-ordered table illustrated in FIG. 5. Since each column extent has a metadata entry, the re-ordered column extents metadata is also reduced, since there are less metadata entries.

The reordering may include sorting the multi-snapshot row scores. See for example—table 4.2 generated by sorting.

The reordering may include clustering the multi-snapshot row scores into clusters of similar scores, so that when the rows are re-ordered according to the clusters, rows having similar scores become consecutive. For example, if the multi-snapshot row scores are bitmaps indicating which cells in the row are full, rows having full cells at the same locations will become consecutive, and forming larger column extents.

The reordering may prioritize a fullness of a newer snapshot or version over a fullness of an older snapshot. For example—the reordering prioritizes a fullness of a newest version.

For example—see tables 4.1 and 4.2 in which the reordering includes sorting the scores, the fullness of the latest snapshot is the most significant and the fullness of the oldest snapshot is the least significant.

The multi-snapshot score may also be indicative of locations of full cells in the row in the multiple snapshots. See, for example the CEID as including location information.

The column extent metadata may include column extent snapshot metadata per snapshot. For example—see version 230(k,1) and version 230(k,2) of FIG. 2.

The column extent metadata parameter may be related to sizes of column extent snapshot metadata of two or more snapshots and sizes of full row elements (full cells) of the two or more snapshots.

The improving of step 520 may include reducing a ratio between an aggregate size of column extents metadata related to the group of rows for one or more snapshots, and an aggregate size of the rows (or data within the rows) of the group of rows for the one or more snapshots.

The improving of step 520 may include reducing a ratio between a weighted sum of sizes of column extents metadata related to the group of rows for one or more snapshots and a weighted sum of sizes of the rows of the group of rows for the one or more snapshots. The weights may be determined in any manner and may be of any value. For example—more weight can be assigned to later snapshots—or to older snapshots.

A snapshot of the snapshots may include tabular data entries that were amended between a formation of a last snapshot before the snapshot and a formation of the snapshot.

See, for example, in FIG. 3, the first version (first snapshot) 320(1) includes multiple column extents filled with values and is taken at t1. The second version (second snapshot) 320(2) stores only cells whose values were changed during a period t1-t2 that corresponds to version 320(2). The newest version (newest snapshot) 320(3) stores only cells whose values were changed during a period t2-t3 that corresponds to version 320(3).

The improving of step 520 may include reducing a ratio between a weighted sum of sizes of column extents metadata related to the group of rows for a snapshot and a weighted sum of sizes of the rows of the group of rows of the snapshot.

Step 510 and 520 may be executed in two or more phases. See, for example the first phase illustrated in FIG. 5 and the second phase illustrated in FIG. 6. There may be more than two phases.

For example—step 510 may include (a) a first phase of generating the multi-snapshot row score to each row of the group of rows that exists in a latest snapshot of the multiple snapshots (and omitting row that were deleted in the latest snapshot), and (b) a second phase of generating the multi-snapshot row score to each row of the group of rows that did not exist in the latest snapshot of the multiple snapshots but exist in a second version that preceded the latest version. Method 500 may be repeated for each of the existing snapshots, and repeating steps 510 and 520 only for rows that exist in the currently handled snapshot that were not exist in a newer version that was handled in a previous phase.

FIG. 7 illustrates a storage system 700 that includes multiple (N) compute nodes 710-1 to 710-N and multiple (M) storage nodes 720-1 to 720-M. The compute nodes implement the logic of the storage system and are configured to execute method 500. The compute nodes communicate with the storage nodes via a network, such as fabric 760, and with one or more client of the database, such as client device 770, via network 750. The storage nodes include various storage devices, such as NVRAM (Non Volatile Random Access Memory) 731 and 732, SSDs (Solid State Drives) 740(1)-740(M1) of storage node 720-1, and SSDs 740(1)-740(M2) of storage node 720-2. The data stored in the database are stored in various storage devices of the storage nodes. The extent metadata of FIG. 2 may reside in a faster storage device, such as NVRAM 731 and 732.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic DSs are merely illustrative and that alternative embodiments may merge logic DSs or circuit elements or impose an alternate decomposition of functionality upon various logic DSs or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for managing column extents of a tabular database, the method comprises:

generating a multi-snapshot row score to each row of a group of rows of the tabular database multiple rows; wherein the multi-snapshot score is indicative of fullness of the row in the multiple snapshots; wherein the group of rows comprises column extents associated with column extents metadata; and improving a column extent metadata parameter by reordering the rows of the group of rows according to the multi-snapshot row scores to provide a re-ordered group of rows that comprises re-ordered column extents associated with re-ordered column extents metadata.

2. The method according to claim 1 wherein the reordering comprises sorting the multi-snapshot row scores.

3. The method according to claim 1 wherein the reordering comprises clustering the multi-snapshot row scores.

4. The method according to claim 1 wherein the reordering prioritizes a fullness of a newer snapshot over a fullness of an older snapshot.

5. The method according to claim 1 wherein the reordering prioritizes a fullness of a newest snapshot.

6. The method according to claim 1 wherein the multi-snapshot score is also indicative of locations of full cells in the row in the multiple snapshots.

7. The method according to claim 1 wherein the column extent metadata comprises column extent snapshot metadata per snapshot.

8. The method according to claim 7 wherein the column extent metadata parameter is related to sizes of column extent snapshot metadata of two or more snapshots and sizes of full row elements of the two or more snapshots.

9. The method according to claim 1 wherein the improving comprises reducing a ratio between an aggregate size of column extents metadata related to the group of rows and for one or more snapshots and an aggregate size of the rows of the group of rows for the one or more snapshots.

10. The method according to claim 1 wherein the improving comprises reducing a ratio between a weighted sum of sizes of column extents metadata related to the group of rows for one or more snapshots and a weighted sum of sizes of the rows of the group of rows for the one or more snapshots.

11. The method according to claim 1 wherein a snapshot of the snapshots comprises tabular data entries that were amended between a formation of a last snapshot before the snapshot and a formation of the snapshot.

12. The method according to claim 1 wherein the improving comprises reducing a ratio between a weighted sum of sizes of column extents metadata related to the group of rows for a snapshot and a weighted sum of sizes of the rows of the group of rows of the snapshot.

13. The method according to claim 1 wherein the generating of the multi-snapshot row score to each row of the group of rows of the tabular database multiple rows comprises (a) a first phase of generating the multi-snapshot row score to each row of the group of rows that exists in a latest snapshot of the multiple snapshots; and a second phase of generating the multi-snapshot row score to each row of the group of rows that did not exist in the latest snapshot of the multiple snapshots.

14. A non-transitory computer readable storage medium that stores instructions for:

generating a multi-snapshot row score to each row of a group of rows of a tabular database multiple rows; wherein the multi-snapshot score is indicative of fullness of the row in the multiple snapshots; wherein the group of rows comprises column extents associated with column extents metadata; and improving a column extent metadata parameter by reordering the rows of the group of rows according to the multi-snapshot row scores to provide a re-ordered group of rows that comprises re-ordered column extents associated with re-ordered column extents metadata.

15. The non-transitory computer readable storage medium according to claim 14 wherein the reordering comprises sorting the multi-snapshot row scores.

16. The non-transitory computer readable storage medium according to claim 14 wherein the reordering comprises clustering the multi-snapshot row scores.

17. A storage system that comprises a controller, the controller is a processing circuitry that comprises one or more integrated circuit, the controller is configured to generate a multi-snapshot row score to each row of a group of rows of a tabular database multiple rows; wherein the multi-snapshot score is indicative of fullness of the row in the multiple snapshots; wherein the group of rows comprises column extents associated with column extents metadata; and improve a column extent metadata parameter by reordering the rows of the group of rows according to the multi-snapshot row scores to provide re-ordered group extents associated with re-ordered column extents associated with re-ordered column extents metadata.

* * * * *